US011429517B2

(12) United States Patent
Meiri et al.

(10) Patent No.: US 11,429,517 B2
(45) Date of Patent: Aug. 30, 2022

(54) CLUSTERED STORAGE SYSTEM WITH STATELESS INTER-MODULE COMMUNICATION FOR PROCESSING OF COUNT-KEY-DATA TRACKS

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 583 days.

(21) Appl. No.: 16/012,990

(22) Filed: Jun. 20, 2018

(65) Prior Publication Data
US 2019/0391912 A1    Dec. 26, 2019

(51) Int. Cl.
*G06F 3/06* (2006.01)
*G06F 12/02* (2006.01)

(52) U.S. Cl.
CPC ............ *G06F 12/023* (2013.01); *G06F 3/061* (2013.01); *G06F 3/067* (2013.01); *G06F 3/0635* (2013.01);
(Continued)

(58) Field of Classification Search
CPC .... G06F 12/0123; G06F 3/061; G06F 3/0635; G06F 3/0644; G06F 3/0658; G06F 3/067; G06F 2212/1016; G06F 2212/154
See application file for complete search history.

(56) References Cited

U.S. PATENT DOCUMENTS 6,704,839 B2 *   3/2004   Butterworth ........ G06F 11/2089
                                                            711/114
7,444,464 B2    10/2008   Urmston et al.
(Continued)

FOREIGN PATENT DOCUMENTS

WO          2016111954 A1     7/2016

OTHER PUBLICATIONS

Fisher (An OS/360 Bdam Users Guide, By Wayne E Fisher, IBM Corporation, Education Center, Jun. 30, 1969). (Year: 1969).*
(Continued)

*Primary Examiner* — Tim T Vo
*Assistant Examiner* — Janice M. Girouard
(74) *Attorney, Agent, or Firm* — Ryan, Mason & Lewis, LLP

(57) ABSTRACT

A storage system in one embodiment comprises multiple storage nodes each comprising at least one storage device. Each of the storage nodes further comprises a set of processing modules configured to communicate over one or more networks with corresponding sets of processing modules on other ones of the storage nodes. The sets of processing modules of the storage nodes each comprise at least one control module. The storage system is configured to assign portions of a logical address space of the storage system to respective ones of the control modules, to receive a plurality of tracks of data records in a count-key-data format, and to store the tracks in respective ones of the portions of the logical address space assigned to respective ones of the control modules. Each of the tracks is stored in its entirety in the portion of the logical address space assigned to a corresponding one of the control modules.

20 Claims, 7 Drawing Sheets

(52) U.S. Cl.
CPC .......... *G06F 3/0644* (2013.01); *G06F 3/0658* (2013.01); *G06F 2212/1016* (2013.01); *G06F 2212/154* (2013.01)

(56) References Cited

U.S. PATENT DOCUMENTS

| | | | |
|---|---|---|---|
| 8,095,726 | B1 | 1/2012 | O'Connell et al. |
| 8,214,612 | B1 | 7/2012 | Natanzon |
| 8,527,724 | B2* | 9/2013 | Banzhaf .............. G06F 11/1076 711/163 |
| 9,104,326 | B2 | 8/2015 | Frank et al. |
| 9,141,477 | B2* | 9/2015 | Amann .............. G06F 11/1076 |
| 9,208,162 | B1 | 12/2015 | Hallak et al. |
| 9,286,003 | B1* | 3/2016 | Hallak .................. G06F 3/0608 |
| 9,606,870 | B1 | 3/2017 | Meiri et al. |
| 9,716,754 | B2 | 7/2017 | Swift |
| 2004/0170158 | A1* | 9/2004 | Man-Hak Tso ......... H04L 12/66 370/351 |
| 2008/0279462 | A1 | 11/2008 | Cell, Jr. |
| 2009/0132955 | A1 | 5/2009 | Garg et al. |
| 2009/0259456 | A1* | 10/2009 | Amann .............. G06F 11/1004 703/23 |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |

OTHER PUBLICATIONS

A computer dictionary definition of the history of count-key-data from yourdictionary.com/count-key-data. Acquired from archive.org from a snapshot taken Aug. 16, 204. (Year: 2014).*

WAP MMS client Transactions Versions Jan. 15, 2002, Wireless Application Protocol Multi media Mesaging Service WAP-206-MMSCTR-2002-0115-a (Year: 2002).*

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/884,577 filed in the name of Zvi Schneider et al. dated Jan. 31, 2018 and entitled "Storage System with Decoupling and Reordering of Logical and Physical Capacity Removal.".

U.S. Appl. No. 15/662,809 filed in the name of William Strange et al. dated Jul. 28, 2017 and entitled "Automatic Verification of Asynchronously Replicated Data.".

* cited by examiner

CLUSTERED STORAGE SYSTEM WITH STATELESS INTER-MODULE COMMUNICATION FOR PROCESSING OF COUNT-KEY-DATA TRACKS

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, the storage efficiency may be significantly degraded when storing data in certain data formats, thereby undermining overall system performance. For example, storage efficiency can be degraded when storing data in a count-key-data format of the type commonly used by mainframe storage systems that do not have content addressable storage functionality.

SUMMARY

Illustrative embodiments provide content addressable storage systems that are configured for efficient storage of count-key-data tracks of the type commonly utilized in a mainframe storage system that does not have content addressable storage functionality. For example, such embodiments can provide a high level of storage efficiency through deduplication and compression even when storing count-key-data tracks. The storage efficiency of the content addressable storage system is therefore not degraded in any significant way when storing data in typical mainframe storage system formats.

Moreover, inter-module communications in some illustrative embodiments are stateless, thereby providing substantial improvements in system performance when processing count-key-data tracks.

These embodiments illustratively include a clustered implementation of a content addressable storage system having a distributed storage controller. Similar advantages can be provided in other types of storage systems.

In one embodiment, an apparatus comprises a storage system that includes multiple storage nodes each comprising at least one storage device. Each of the storage nodes further comprises a set of processing modules configured to communicate over one or more networks with corresponding sets of processing modules on other ones of the storage nodes. The sets of processing modules each comprise at least one control module, and can include additional modules, such as routing modules and data modules.

The storage system in this embodiment is configured to assign portions of a logical address space of the storage system to respective ones of the control modules, to receive a plurality of tracks of data records in a count-key-data format, and to store the tracks in respective ones of the portions of the logical address space assigned to respective ones of the control modules. Each of the tracks is stored in its entirety in the portion of the logical address space assigned to a corresponding one of the control modules.

The sets of processing modules collectively comprise at least a portion of a distributed storage controller of the storage system. The assignment of portions of the logical address space of the storage system to respective ones of the control modules in some embodiments is implemented at least in part by at least one system-wide management module of the distributed storage controller. Multiple distinct portions of the logical address space may be assigned to at least one of the control modules.

As indicated above, the sets of processing modules in some embodiments each comprise at least one routing module in addition to the control module. Such a routing module is illustratively configured to receive a given one of the tracks of data records in one or more communications of a first count-key-data protocol, and to route the given track of data records to the control module in one or more communications of a second count-key-data protocol different than the first count-key-data protocol for storage in at least one of the storage devices. For example, the second count-key-data protocol may comprise a simplified count-key-data protocol relative to a typically much more complex proprietary protocol of a given mainframe storage system.

These and other example communications between the routing module and the control module are stateless. Accordingly, first and second distinct routing modules can communicate with the control module without requiring transfer of state information from the first routing module to the second routing module.

In some embodiments, a native page size of the storage system is less than a size of a given one of the tracks of data records such that the given track of data records is stored utilizing multiple pages of the portion of the logical address space assigned to the corresponding one of the control modules. The portion of the logical address space has a size defined as a multiple of the native page size of the storage system.

At least a subset of the portions of the logical address space illustratively comprise respective equal-size portions each comprising a designated number of pages in a native page size of the storage system. For example, the designated number of pages in each of the equal-sized portions may be at least four pages.

In some embodiments, in conjunction with storing a given one of the tracks of data records in the count-key-data format in one of the portions of the logical address space assigned to one of the control modules, count and key information of the data records is stored in a designated page of a set of pages of the portion and data of the data records is stored in one or more other pages of the set of pages. Numerous other storage arrangements may be used to store the tracks of data records in other embodiments.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
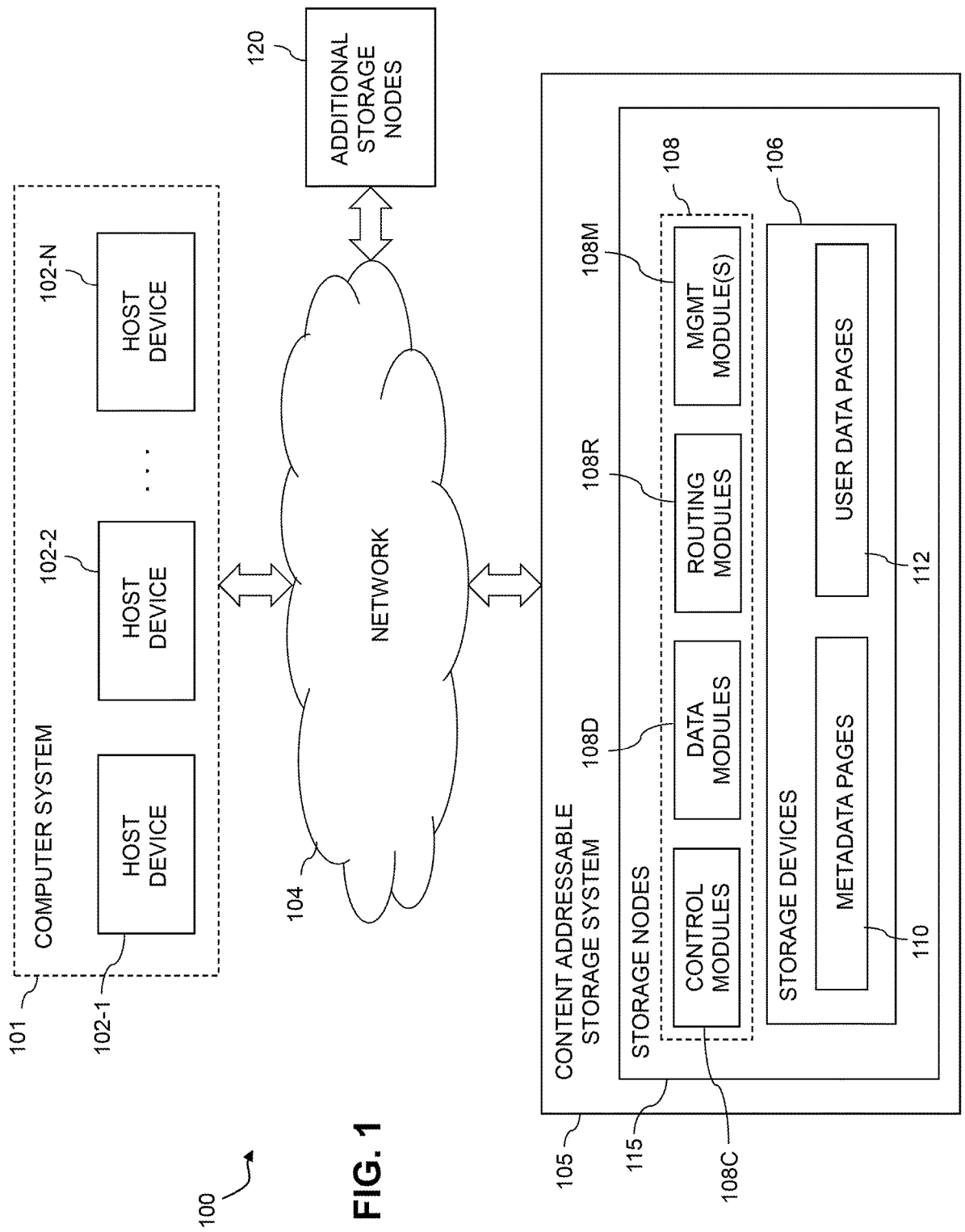
FIG. 1 is a block diagram of an information processing system comprising a content addressable storage system configured for efficient storage of count-key-data tracks in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate efficient storage of count-key-data tracks as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP and Transmission Control Protocol (TCP). For example, respective sets of IP links used in data transfer and corresponding messaging could be associated with respective different ones of the routing modules 108R.

The distributed storage controller 108 of the content addressable storage system 105 in the present embodiment is configured to control the implementation of functionality for efficient storage of count-key-data tracks as disclosed herein. The distributed storage controller 108 is assumed to comprise a type of "processing device" as that term is broadly used herein, and more particularly comprises at least one processor coupled to a memory.

The content addressable storage system 105 under the control of the distributed storage controller 108 is operative to assign portions of a logical address space of the content addressable storage system 105 to respective ones of the control modules 108C, to receive a plurality of tracks of data records in a count-key-data format, and to store the tracks in respective ones of the portions of the logical address space assigned to respective ones of the control modules 108C, with each of the tracks being stored in its entirety in the portion of the logical address space assigned to a corresponding one of the control modules 108C. The assignment of portions of the logical address space of the content addressable storage system 105 to respective ones of the control modules 108C is implemented at least in part by at least one management module 108M of the distributed storage controller 108. Multiple distinct portions of the logical address space may be assigned to each of one or more of the control modules 108C.

In some embodiments, a given one of the routing modules 108R of the distributed storage controller 108 is configured to receive a given one of the tracks of data records in one or more communications of a first count-key-data protocol, and to route the given track of data records to a particular one of the control modules 108C in one or more communications of a second count-key-data protocol different than the first count-key-data protocol for storage in at least one of the storage devices. For example, the second count-key-data protocol may comprise a simplified count-key-data protocol relative to a typically much more complex proprietary protocol of a given mainframe storage system.

The communications between the routing module and the control module are stateless so as to thereby permit first and second distinct ones of the routing modules 108R to communicate with the control module without requiring transfer of state information from the first routing module to the second routing module.

A native page size of the content addressable storage system 105 is illustratively less than a size of a given one of the tracks of data records such that the given track of data records is stored utilizing multiple pages of the portion of the logical address space assigned to the corresponding one of the control modules 108C. For example, the portion of the logical address space may have a size defined as a multiple of the native page size of the storage system.

In some embodiments, at least a subset of the portions of the logical address space comprise respective equal-size portions each comprising a designated number of pages in a native page size of the content addressable storage system 105.

In conjunction with storing the tracks in respective portions of the logical address space assigned to respective ones of the control modules 108C, the content addressable storage system 105 is further operative to receive a plurality of data records of a given one of the tracks in a count-key-data format, to separate count and key portions of the data records from remaining portions of the data records, to store the count and key portions of the data records in at least one designated page of a set of pages of a logical storage volume of the content addressable storage system 105, and to store the remaining portions of the data records in one or more other pages of the set of pages of the logical storage volume of the content addressable storage system 105. The set of pages illustratively comprises at least a portion of at least one LUN comprising multiple ones of the user data pages 112.

For example, in some embodiments, the designated page of the set of pages of the logical storage volume comprises a first page of the set of pages, and the one or more other pages of the set of pages comprise respective ones of a sequence of consecutive pages following the first page. A more detailed example of an arrangement of this type will be described below in conjunction with FIGS. 3, 4 and 5.

The data records are illustratively part of a particular track comprising multiple data records in the count-key-data format. For example, the count portion for a given one of the data records illustratively comprises a count field indicating a length of the given data record, the key portion for the given one of the data records comprises a key field including key information of the given data record, and the remaining portion for the given one of the data records comprises user data of the given data record. Other types of count-key-data formats may be used in other embodiments. The term "count-key-data" as used herein is intended to be broadly construed, and should not be construed as limited to the particular arrangements used in any of the format examples described herein. Also, terms such as "track" and "data record" as used herein are similarly intended to be broadly construed.

For example, a "track" may refer to a designated portion of a storage device "cylinder" that contains a plurality of tracks, with each track comprising a plurality of data records each having count, key and data fields in accordance with the count-key-data format. Other track and data record configurations can be used in other embodiments.

In some embodiments, storing the count and key portions of the data records in at least one designated page of a set of pages of a logical storage volume of the content addressable storage system 105 comprises storing the count and key portions for a given one of the records in the designated page in association with a pointer to a location of the remaining portion of the given one of the records in the one or more other pages of the set of pages.

Accordingly, the designated page illustratively comprises a plurality of entries for count and key portions of respective ones of the data records with each of the entries of the designated page comprising count and key portions for a given one of the data records and a pointer to a location of the remaining portion of the given one of the records in the one or more other pages of the set of pages.

The content addressable storage system 105 under the control of the storage controller 108 can be configured to perform deduplication and/or compression operations on at least a portion of the set of pages, possibly bypassing the designated page in which the count and key portions of the data records are stored as the designated page is unlikely to be significantly reducible via deduplication and/or compression.

Thus, in some embodiments, the content addressable storage system 105 is configured to perform a deduplication operation on the one or more other pages of the set of pages of the logical storage volume but not on the designated page of the set of pages, and/or to perform a compression operation on the one or more other pages of the set of pages of the logical storage volume but not on the designated page of the set of pages. Alternatively, deduplication and/or compression operations can be performed on the full set of pages, possibly in combination with other sets of pages, even though the designated page of the full set of pages is unlikely to be significantly reducible via deduplication and/or compression.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The count-key-data track storage functionality in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include count-key-data track storage control logic that engages or otherwise interacts with corresponding control logic instances in all of the control modules 108C and routing modules 108R in order to implement a count-key-data track storage process.

In some embodiments, the content addressable storage system 105 comprises an XtremIO™ storage array suitably modified to incorporate techniques for efficient storage of count-key-data tracks as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, count-key-data track storage functionality in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement count-key-data track storage functionality in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for efficient storage of count-key-data tracks as disclosed herein can be implemented in a host device, in a storage system, or partially in a host device and partially in a storage system.

Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
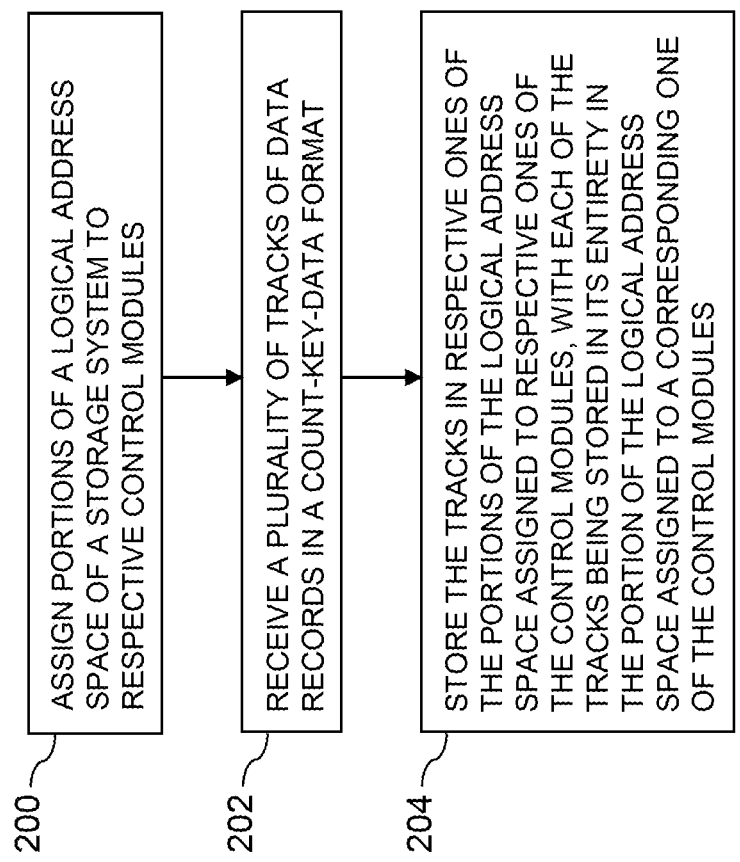
FIG. 2 is a flow diagram of a process for efficient storage of count-key-data tracks in a content addressable storage system in an illustrative embodiment.

The operation of the information processing system 100 will now be described in further detail with reference to the flow diagram of FIG. 2. The flow diagram of FIG. 2 illustrates a process for efficient storage of count-key-data tracks in a content addressable storage system. The process includes steps 200 through 204, and is suitable for use in system 100 but is more generally applicable to other types of systems in which it is desirable to store count-key-data tracks in an efficient manner that can take full advantage of any deduplication and/or compression functionality available within that system. The steps of the flow diagram are illustratively performed at least in part under the control of a storage controller of a storage system, such as the distributed storage controller 108 of content addressable storage system 105.

In step 200, portions of a logical address space of a storage system are assigned to respective control modules of respective sets of processing modules in respective storage nodes of a storage system. In some cases, multiple distinct portions of the logical address space are assigned to at least one of the control modules. Each control module of a plurality of control modules is therefore assigned at least one distinct portion of the logical address space of the storage system in this step.

In step 202, a plurality of tracks of data records are received in a count-key-data format. It is assumed that each of the tracks comprises a plurality of data records in a count-key-data format. The data records in the count-key-data format may be received in a storage system from one or more host devices. As another example, the data records in the count-key-data format may be received in one storage system from another storage system, such as in a content addressable storage system from a mainframe storage system, possibly via one or more intermediate host devices. Different ones of the data records in the count-key-data format may be received from different sources of such data records, including different host devices, storage systems or other system entities.

In step 204, the tracks are stored in respective ones of the portions of the logical address space assigned to respective ones of the control modules, with each of the tracks being stored in its entirety in the portion of the logical address space assigned to a corresponding one of the control modules.

In some implementations of the FIG. 2 process, the sets of processing modules each comprise at least one routing module in addition to the control module. For example, distributed storage controller 108 of content addressable storage system 105 comprises control modules 108C and routing modules 108R. Such a routing module is illustratively configured to receive a given one of the tracks of data records in one or more communications of a first count-key-data protocol, and to route the given track of data records to the control module in one or more communications of a second count-key-data protocol different than the first count-key-data protocol for storage in at least one of the storage devices.

For example, the second count-key-data protocol may comprise a simplified count-key-data protocol relative to a typically much more complex proprietary protocol of a given mainframe storage system.

These and other example communications between the routing module and the control module are stateless. Accordingly, first and second distinct routing modules can communicate with the control module without requiring transfer of state information from the first routing module to the second routing module.

As a more particular example, the above-noted proprietary protocol of a given mainframe storage system may be optimized for carrying count-key-data tracks as well as associated control commands. A proprietary protocol of this type may be implemented in a given embodiment as a layer-4 Fibre Channel protocol, possibly in place of a Small Computer System Interface (SCSI) protocol.

Routing modules of the type described above provide a channel interface to the host devices and are stateless. Such routing modules can be configured to parse incoming count-key-data semantics in the proprietary protocol and to convert such semantics to simplified read/write commands in the count-key-data format.

These simplified commands represent an example of the second count-key-data protocol mentioned above, also referred to as a simplified count-key-data protocol relative to the more complex proprietary protocol. The routing modules send the simplified commands to the appropriate control modules. For example, a given routing module may send a simplified command such "read count field of record 10" or "write record 0" for a given track to its corresponding control module. Each count-key-data track in an illustrative embodiment is "owned" by a unique control module. Such an arrangement allows a host device to disconnect from one routing module and reconnect to another routing module, without the need to transfer state information between the routing modules.

In some embodiments, a native page size of the storage system is less than a size of a given one of the tracks of data records such that the given track of data records is stored utilizing multiple pages of the portion of the logical address space assigned to the corresponding one of the control modules. The portion of the logical address space may have a size defined as a multiple of the native page size of the storage system. Multiple portions of the logical address space may comprise respective equal-size portions each comprising a designated number of pages in a native page size of the storage system. For example, the designated number of pages in each of the equal-sized portions may be at least four pages, although numerous other portion sizes may be used in other embodiments.

The logical address space may therefore be divided across a plurality of control modules using sets of pages of predetermined size, such as four pages of 16 KB each. Thus, even though the native page size of the storage system may be smaller than the typical count-key-data track size, it is guaranteed that all the pages storing a given count-key-data track are assigned to the same control module.

An illustrative example of a particular manner in which multiple tracks can each be stored in their entirety in respective portions of the logical address space assigned to respective ones of the control modules as specified in step 204 of the FIG. 2 process will now be described in detail with reference to FIGS. 3, 4 and 5.

Figure 3:
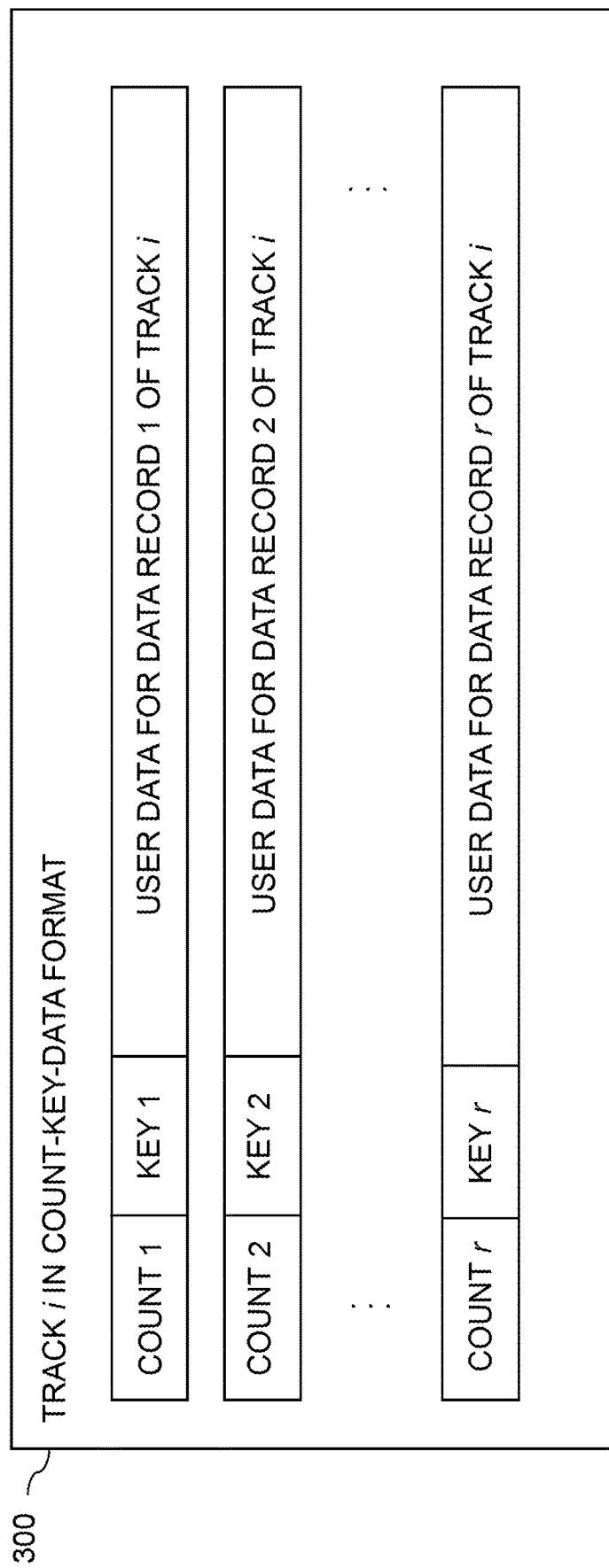
FIG. 3 shows an example track of data records in a count-key-data format in an illustrative embodiment.

As shown in FIG. 3, a given track 300 in this example is also denoted as track i and comprises a plurality of data records, each having a count field, a key field and a user data field. There are r data records in track i in this example. The first data record has a count field containing a count value denoted Count 1, the second data record has a count field containing a count value denoted Count 2, and the r-th data record has a count field containing a count value denoted Count r. Similarly, the first data record has a key field containing a key value denoted Key 1, the second data record has a key field containing a key value denoted Key 2, and the r-th data record has a key field containing a key value denoted Key r. Each of the data records also includes a user data field which may be a variable length field. Although for simplicity of illustration the user data fields are shown in the figure as having the same length, it should be understood that the user data fields are more generally variable length fields.

For example, in some embodiments, a given track may comprise 56.5 KB of data records in count-key-data format, with each data record having count, key and data fields. The count and key fields are typically small, in some cases on the order of 8 bytes, while the user data field is of variable length.

The count and key fields are an example of what are more generally referred to herein as count and key portions of the data records of the track 300. The count field of a given one of the data records in this embodiment indicates the length of the given data record, and the key field includes key information of that data record. The key information is illustratively utilized for various data management functions. The user data field of the given data record is an example of what is more generally referred to herein as a "remaining portion" of the given data record. Other types of count and key portions, remaining portions, and count-key-data formats may be used in other embodiments. A given "remaining portion" as that term is broadly used herein may but need not comprise all portions of a data record other than the count and key portions.

In this embodiment, count and key portions of the received data records are separated from remaining portions of the data records. The remaining portions of the data records generally include user data portions of those data records. The count and key portions of the data records are stored in at least one designated page of a set of pages of a logical storage volume of a storage system, and the remaining portions of the data records are stored in one or more other pages of the set of pages of the logical storage volume of the storage system.

For example, in some implementations, the designated page of the set of pages of the logical storage volume comprises a first page of the set of pages and the one or more other pages of the set of pages comprise respective ones of a sequence of consecutive pages following the first page.

The set of pages of the logical storage volume is an example of what is more generally referred to herein as a "portion of a logical address space" assigned to a particular one of a plurality of control modules.

The designated page illustratively comprises a plurality of entries for count and key portions of respective ones of the data records with each of the entries of the designated page comprising count and key portions for a given one of the data records and a pointer to a location of the remaining portion of the given one of the records in the one or more other pages of the set of pages. The pointers illustratively comprise respective offsets indicating the locations of the respective remaining portions in the one or more other pages of the set of pages. For example, a given entry corresponding to a given data record illustratively comprises a count value from a count field of the data record, a key value from a key field of the given data record, and an offset denoting the location of the user data from the user data field of the given data record in the one or more other pages of the set of pages.

Figure 4:
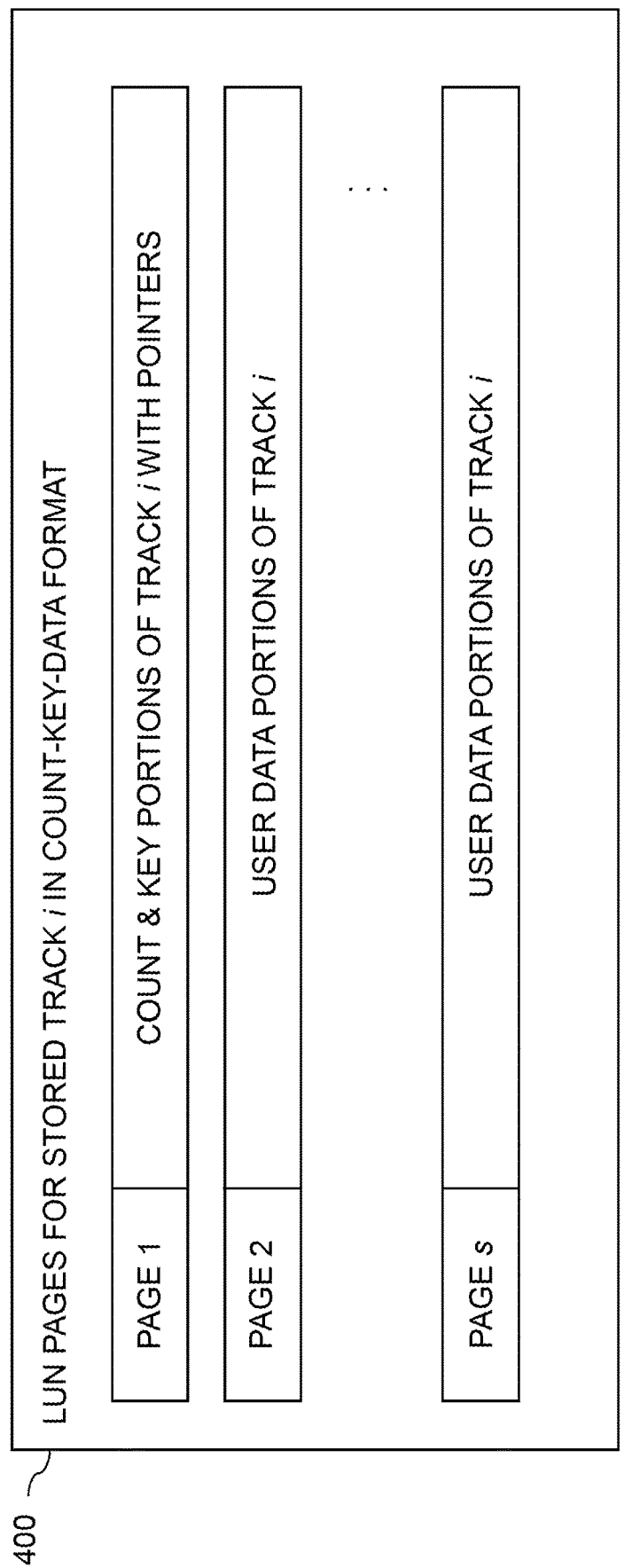
FIG. 4 shows an example of a manner in which the data records of FIG. 3 are stored utilizing a designated page for count and key portions and additional pages for remaining portions in an illustrative embodiment.

FIG. 4 shows an example of a manner in which the data records of FIG. 3 are stored utilizing a designated page for count and key portions and additional pages for remaining portions in an illustrative embodiment. More particularly, in this example, track i of FIG. 3 is stored in a set of LUN pages 400 denoted Page 1, Page 2, . . . Page s. Page 1 is the "designated page" that stores the count and key portions of the data records of track i and respective corresponding pointers in this example, and Page 2 through Page s are the "other pages" that store the remaining portions of the data records of track i.

Figure 5:
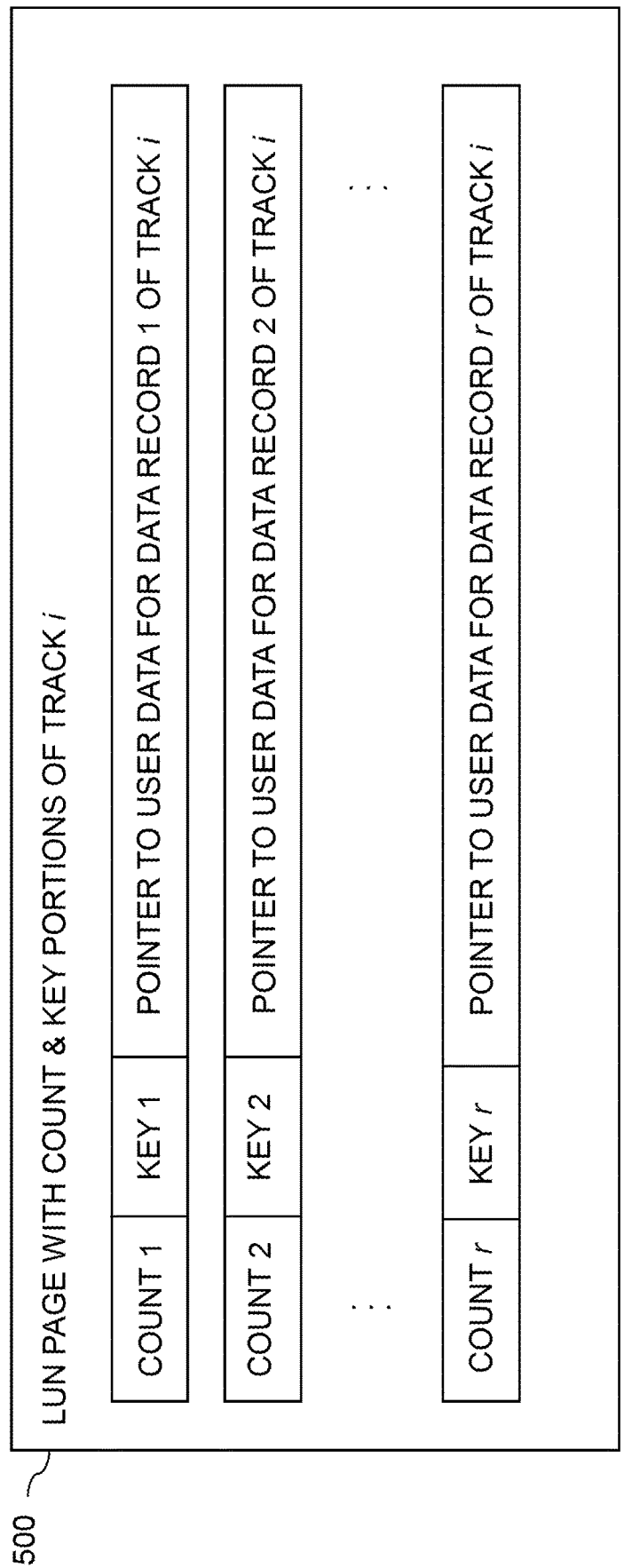
FIG. 5 shows a more detailed view of the page of FIG. 4 containing count and key portions of the data records in association with respective pointers to remaining user data portions of those data records in an illustrative embodiment.

FIG. 5 shows a LUN page 500 that provides a more detailed view of Page 1 of FIG. 4 containing count and key portions of the data records in association with respective pointers to remaining user data portions of those data records in an illustrative embodiment. More particularly, the LUN page 500 comprises the count and key portions of all of the data records of track i and respective corresponding pointers. The LUN page 500 as shown comprises a plurality of entries for count and key portions of respective ones of the data records with each of the entries of the LUN page 500 comprising count and key portions for a given one of the data records and a pointer to a location of the remaining portion of the given one of the records in Page 2 through Page s in the set of LUN pages 400. The first entry of LUN page 500 has a count field containing Count 1, a key field containing Key 1, and a pointer to user data for Data Record 1 of track i in Page 2 through Page s. Similarly, the second entry of LUN page 500 has a count field containing Count 2, a key field containing Key 2, and a pointer to user data for Data Record 2 of track i in Page 2 through Page s, and the r-th entry of LUN page 500 has a count field containing Count r, a key field containing Key r, and a pointer to user data for Data Record r of track i in Page 2 through Page s.

As mentioned previously, the pointers in LUN page 500 in some embodiments more particularly comprise respective offsets indicating the locations of the user data of the respective data records in Page 2 through Page s. In such an arrangement, an offset value in an offset field of the first entry of LUN page 500 would identify the particular location of the user data of Data Record 1 in Page 2 through Page s. The other entries would include similar offset values for the other data records. Again, other types of tracks, data records, fields, portions and pages can be used in other embodiments.

An arrangement of the type described in conjunction with FIGS. 3 through 5 separates the count and key portions of the data records of a track from the user data portions of those data records, stores the count and key portions in a first page of a set of pages with pointers to the user data portions in other pages of the set of pages. Such an arrangement provides significant advantages in terms of facilitating performance of effective deduplication and/or compression operations on the user data portions. This effective deduplication and/or compression would not otherwise be possible if the count and key portions were stored interspersed with their corresponding user data portions as in the original received track. In addition, the example arrangement of FIGS. 3 through 5 allows the location of user data for any of the data records of the track to be determined by simply reading the first page of the set of pages used to store those data records.

The example arrangement illustrated for track i in FIGS. 3, 4 and 5 can be implemented in a similar manner for each of the other tracks stored in step 204 of the FIG. 2 process. Other embodiments can utilize alternative arrangements for storing tracks of data records in a count-key-data format.

The particular processing operations and other system functionality described above in conjunction with the flow diagram of FIG. 2 are presented by way of illustrative example only, and should not be construed as limiting the scope of the disclosure in any way. Alternative embodiments can use other types of processing operations for efficient storage of count-key-data tracks in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient count-key-data track storage processes for respective different datasets or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 2 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for efficient storage of count-key-data tracks as disclosed herein can provide a number of significant advantages relative to conventional arrangements.

For example, some embodiments provide content addressable storage systems that are configured for efficient storage of count-key-data tracks of the type commonly utilized in a mainframe storage system that does not have content addressable storage functionality. Such embodiments can provide a high level of storage efficiency through deduplication and compression even when storing count-key-data tracks. The storage efficiency of the content addressable storage system is therefore not degraded in any significant way when storing data in typical mainframe storage system formats.

These illustrative embodiments overcome disadvantages that might otherwise occur if the data records of a given storage track were sequentially stored in one or more pages such that count and key portions of the data records are interspersed with the user data portions of the data records throughout all of the pages. For example, storage of the data records in such a manner would tend to substantially reduce the effectiveness of any deduplication or compression operation that is applied to the stored data records.

Moreover, inter-module communications in some illustrative embodiments are stateless, thereby providing substantial improvements in system performance when processing count-key-data tracks. For example, some embodiments are configured with routing modules that convert communications of a relatively complex count-key-data protocol to communications of a relatively simple count-key-data protocol. The resulting communications are stateless, thereby permitting a given control module to disconnect from and reconnect to different routing modules without the need to transfer state between those routing modules. Such arrangements provide significantly enhanced inter-module communication efficiency.

Some embodiments can be configured to run entirely within a content addressable storage system or other type of storage system, without any need for modification of host devices. For example, in some embodiments, a content addressable storage system is configured to emulate a mainframe storage system in presenting a storage interface supporting a count-key-data format to one or more host devices.

In one or more embodiments, functionality for efficient storage of count-key-data tracks can be implemented in a host device, in a storage system, or partially in a host device and partially in a storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for efficient storage of count-key-data tracks will now be described in greater detail with reference to FIGS. 6 and 7. Although described in the context of system 100, these platforms may also be used to implement at least portions of other information processing systems in other embodiments.

Figure 6:
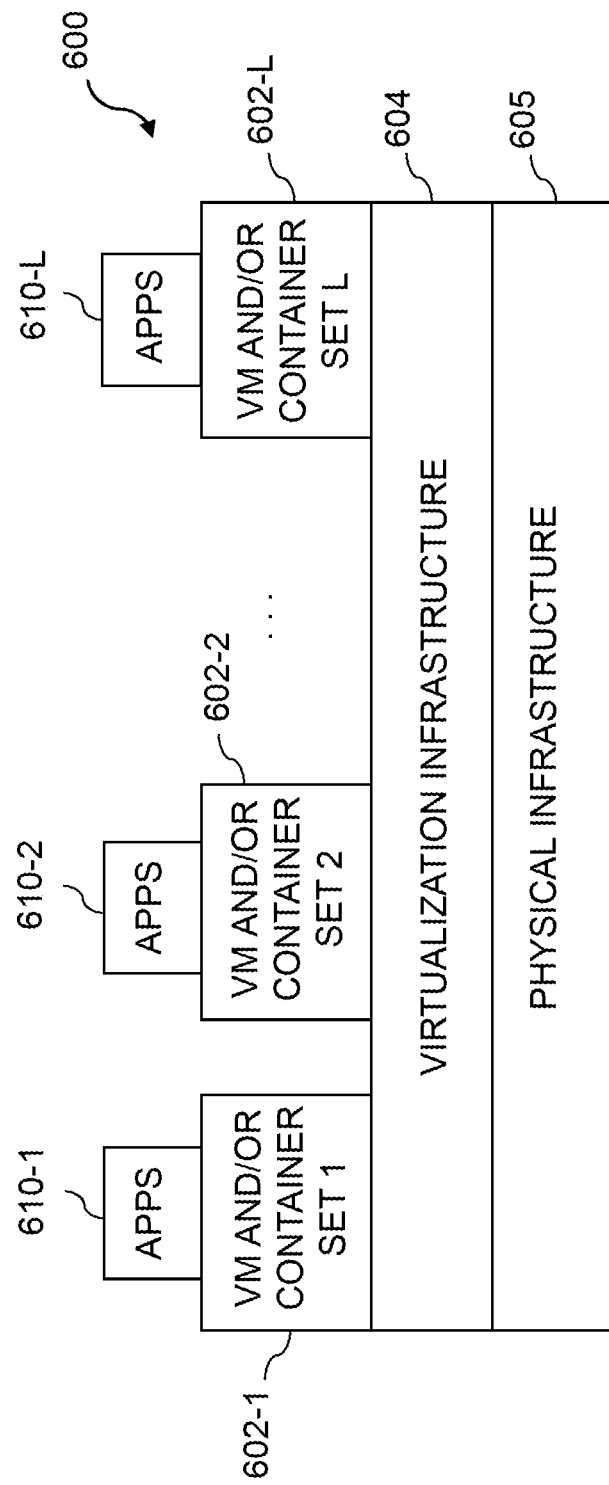
FIGS. 6 and 7 show examples of processing platforms that may be utilized to implement at least a portion of an information processing system in illustrative embodiments.
Figure 7:
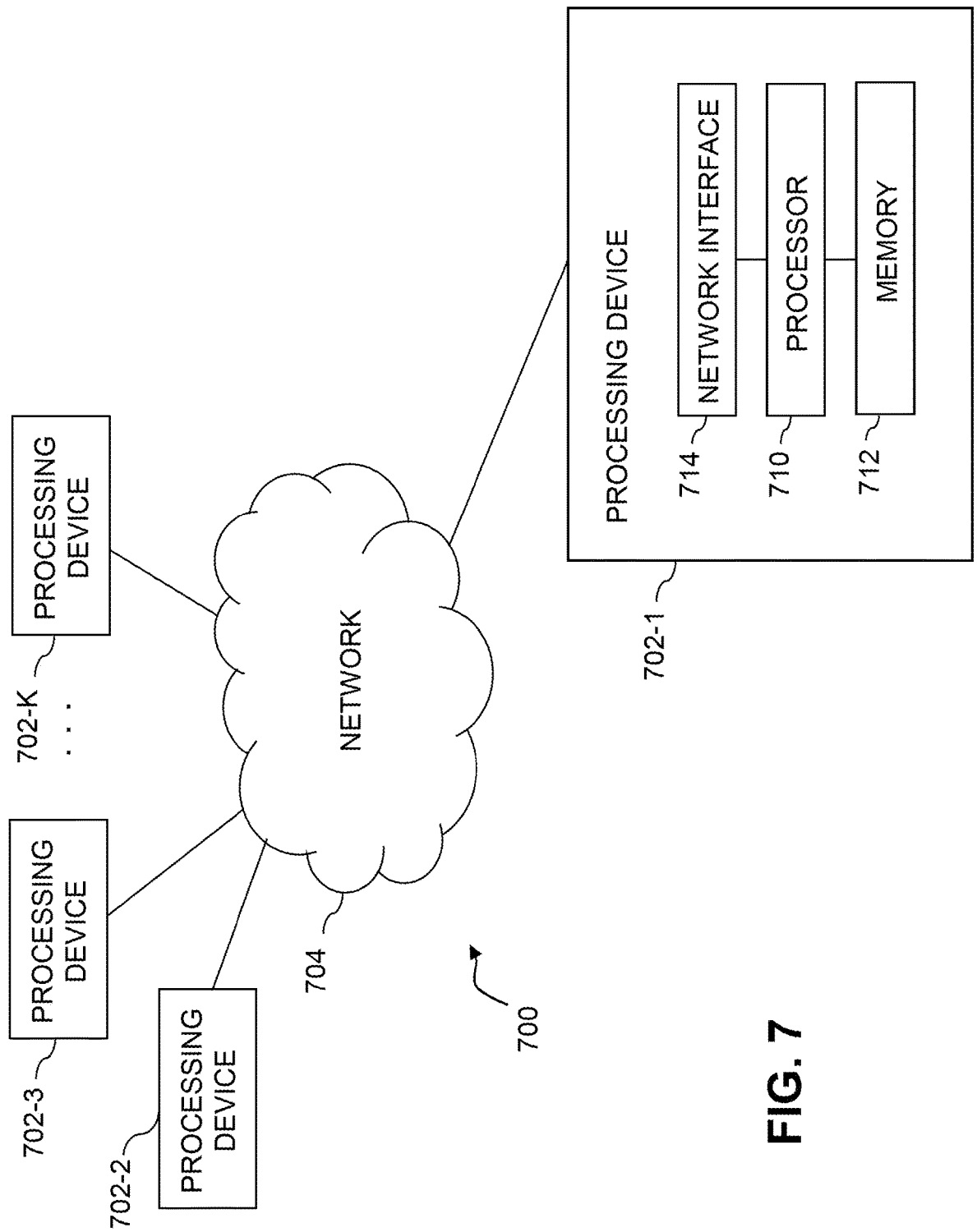

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide storage functionality of the type described above for one or more processes running on a given one of the VMs.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 2 process for efficient storage of count-key-data tracks.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the count-key-data track storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, count-key-data track storage processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   a content addressable storage system comprising a plurality of storage nodes each comprising at least one storage device, the content addressable storage system comprising separate logical and physical storage layers;
   each of the storage nodes further comprising:
   a processor coupled to a memory; and
   a set of processing modules configured to communicate over one or more networks with corresponding sets of processing modules on other ones of the storage nodes;
   the sets of processing modules of the storage nodes each comprising at least one control module and at least one data module;
   the control modules of the sets of processing modules of the storage nodes collectively implementing the logical storage layer of the content addressable storage system by mapping logical blocks targeted by input-output operations to respective content-based signatures for delivery to the data modules;
   the data modules of the sets of processing modules of the storage nodes collectively implementing the physical storage layer of the content addressable storage system by mapping content-based signatures received from the control modules to respective physical blocks in the storage devices of the storage nodes;
   the content addressable storage system being configured:
   to assign different portions of a logical address space of the logical storage layer of the content addressable storage system to respective ones of the control modules;
   to assign different portions of a content-based signature space of the physical storage layer of the content addressable storage system to respective ones of the data modules;
   to receive a plurality of tracks of data records in a count-key-data format; and to store the tracks in respective ones of the portions of the logical address space assigned to respective ones of the control modules;

wherein each of the tracks is stored in its entirety in the portion of the logical address space assigned to a corresponding one of the control modules; and wherein different data pages of a given one of the tracks are stored in different portions of the content-based signature space assigned to different ones of the data modules in accordance with variations in content between the different data pages.

2. The apparatus of claim 1 wherein the sets of processing modules collectively comprise at least a portion of a distributed storage controller of the storage system.

3. The apparatus of claim 2 wherein the assignment of portions of the logical address space of the storage system to respective ones of the control modules is implemented at least in part by at least one system-wide management module of the distributed storage controller.

4. The apparatus of claim 1 wherein the sets of processing modules each comprise at least one routing module in addition to the control module and the data module.

5. The apparatus of claim 4 wherein the routing module is configured:

to receive a given one of the tracks of data records in one or more communications of a first count-key-data protocol; and to route the given track of data records to the control module in one or more communications of a second count-key-data protocol different than the first count-key-data protocol for storage in at least one of the storage devices.

6. The apparatus of claim 4 wherein communications between the routing module and the control module are stateless so as to thereby permit first and second distinct routing modules to communicate with the control module without requiring transfer of state information from the first routing module to the second routing module.

7. The apparatus of claim 1 wherein a native page size of the storage system is less than a size of a given one of the tracks of data records such that the given track of data records is stored utilizing multiple pages of the portion of the logical address space assigned to the corresponding one of the control modules.

8. The apparatus of claim 7 wherein the portion of the logical address space has a size defined as a multiple of the native page size of the storage system.

9. The apparatus of claim 1 wherein at least a subset of the portions of the logical address space comprise respective equal-size portions each comprising a designated number of pages in a native page size of the storage system.

10. The apparatus of claim 9 wherein the designated number of pages in each of the equal-sized portions is at least four pages.

11. The apparatus of claim 1 wherein multiple distinct portions of the logical address space are assigned to at least one of the control modules.

12. The apparatus of claim 1 wherein in conjunction with storing a given one of the tracks of data records in the count-key-data format in one of the portions of the logical address space assigned to one of the control modules, count and key information of the data records is stored in a designated page of a set of pages of the portion and data of the data records is stored in one or more other pages of the set of pages.

13. The apparatus of claim 1 wherein the storage devices comprise respective non-volatile memory devices.

14. A method comprising:

configuring a content addressable storage system to include a plurality of storage nodes each comprising at least one storage device, the content addressable storage system comprising separate logical and physical storage layers, each of the storage nodes further comprising a set of processing modules configured to communicate over one or more networks with corresponding sets of processing modules on other ones of the storage nodes, the sets of processing modules each comprising at least one control module and at least one data module;

the control modules of the sets of processing modules of the storage nodes collectively implementing the logical storage layer of the content addressable storage system by mapping logical blocks targeted by input-output operations to respective content-based signatures for delivery to the data modules;

the data modules of the sets of processing modules of the storage nodes collectively implementing the physical storage layer of the content addressable storage system by mapping content-based signatures received from the control modules to respective physical blocks in the storage devices of the storage nodes;

the method further comprising:

assigning different portions of a logical address space of the logical storage layer of the content addressable storage system to respective ones of the control modules;

assigning different portions of a content-based signature space of the physical storage layer of the content addressable storage system to respective ones of the data modules;

receiving a plurality of tracks of data records in a count-key-data format; and storing the tracks in respective ones of the portions of the logical address space assigned to respective ones of the control modules;

wherein each of the tracks is stored in its entirety in the portion of the logical address space assigned to a corresponding one of the control modules;

wherein different data pages of a given one of the tracks are stored in different portions of the content-based signature space assigned to different ones of the data modules in accordance with variations in content between the different data pages; and wherein the method is performed by at least one processing device comprising a processor coupled to a memory.

15. The method of claim 14 wherein the sets of processing modules each comprise at least one routing module in addition to the control module and the data module.

16. The method of claim 15 wherein the routing module is configured:

to receive a given one of the tracks of data records in one or more communications of a first count-key-data protocol; and to route the given track of data records to the control module in one or more communications of a second count-key-data protocol different than the first count-key-data protocol for storage in at least one of the storage devices.

17. A computer program product comprising a non-transitory processor-readable storage medium having stored therein program code of one or more software programs, wherein the program code when executed by at least one processing device causes said at least one processing device:

to configure a content addressable storage system to include a plurality of storage nodes each comprising at least one storage device, the content addressable storage system comprising separate logical and physical storage layers, each of the storage nodes further comprising a set of processing modules configured to communicate over one or more networks with corresponding sets of processing modules on other ones of the storage nodes, the sets of processing modules each comprising at least one control module and at least one data module;

the control modules of the sets of processing modules of the storage nodes collectively implementing the logical storage layer of the content addressable storage system by mapping logical blocks targeted by input-output operations to respective content-based signatures for delivery to the data modules;

the data modules of the sets of processing modules of the storage nodes collectively implementing the physical storage layer of the content addressable storage system by mapping content-based signatures received from the control modules to respective physical blocks in the storage devices of the storage nodes;

to assign different portions of a logical address space of the logical storage layer of the content addressable storage system to respective ones of the control modules;

to assign different portions of a content-based signature space of the physical storage layer of the content addressable storage system to respective ones of the data modules;

to receive a plurality of tracks of data records in a count-key-data format; and to store the tracks in respective ones of the portions of the logical address space assigned to respective ones of the control modules;

wherein each of the tracks is stored in its entirety in the portion of the logical address space assigned to a corresponding one of the control modules; and wherein different data pages of a given one of the tracks are stored in different portions of the content-based signature space assigned to different ones of the data modules in accordance with variations in content between the different data pages.

18. The computer program product of claim 17 wherein the sets of processing modules each comprise at least one routing module in addition to the control module and the data module.

19. The computer program product of claim 18 wherein the routing module is configured:

to receive a given one of the tracks of data records in one or more communications of a first count-key-data protocol; and to route the given track of data records to the control module in one or more communications of a second count-key-data protocol different than the first count-key-data protocol for storage in at least one of the storage devices.

20. The computer program product of claim 17 wherein in conjunction with storing a given one of the tracks of data records in the count-key-data format in one of the portions of the logical address space assigned to one of the control modules, count and key information of the data records is stored in a designated page of a set of pages of the portion and data of the data records is stored in one or more other pages of the set of pages.

\* \* \* \* \*